United States Patent
Choi et al.

(10) Patent No.: US 7,020,469 B2
(45) Date of Patent: Mar. 28, 2006

(54) METHOD FOR POWER SAVING ROUTING IN WIRELESS NETWORKS

(75) Inventors: Jong Mu Choi, Gunpo (KR); Jai Hoon Kim, Yongin (KR); Young Bae Ko, Gunpo (KR)

(73) Assignee: Daewoo Educational Foundation, Kyeonggi-do (KR)

( * ) Notice: Subject to any disclaimer, the term of this patent is extended or adjusted under 35 U.S.C. 154(b) by 220 days.

(21) Appl. No.: 10/667,733

(22) Filed: Sep. 22, 2003

(65) Prior Publication Data

US 2004/0229622 A1 Nov. 18, 2004

(30) Foreign Application Priority Data

May 12, 2003 (KR) ...................... 10-2003-0029937

(51) Int. Cl.
*H04Q 7/20* (2006.01)

(52) U.S. Cl. .................. 455/445; 455/574; 455/343.1; 370/311

(58) Field of Classification Search ................ 455/455, 455/574, 343.1, 343.2, 343.3, 343.4, 343.5, 455/343.6; 370/338, 311, 216, 236

See application file for complete search history.

(56) References Cited

U.S. PATENT DOCUMENTS 6,415,161 B1 * 7/2002 Fujita .......................... 455/561

OTHER PUBLICATIONS

Power-Aware Localized Routing in Wireless Networks□□Ivan Stojmenovic and Xu Lin□□IEEE Transactions on Parallel and Distributed Systems, vol. 12, No. 10, Oct. 2001□□p. 5-6.*
Stojmenovic and Lin, "Power-Aware Localized Routing in Wireless Networks", Ieee Transactions on Parallel and Distribution Systems, vol. 12, No. 10, Oct. 2001,
Heinzelnman et al., "Eergy-efficient Routing Protocols For Wireless Microsensor Networks",Proceedings of the 33rd Hawaii International COnference on System Sciences, 2000, no month used.
Jong-Mu Choi et al., "Power Saving Routing Scheme in Wireless Networks", Apr. 2003.

* cited by examiner

*Primary Examiner*—Sonny Trinh
*Assistant Examiner*—Dung Lam
(74) *Attorney, Agent, or Firm*—Law Offices of Royal W. Craig

(57) ABSTRACT

A method for power saving routing in wireless networks is disclosed. The present invention calculates a distance to a destination node to select and estimate candidate nodes so as to reduce the amount of calculations in the event of routing. Furthermore, the invention repeats the algorithm by optimum value n so that accessibility to the destination node can be obtained. This enables more efficient routing.

6 Claims, 7 Drawing Sheets

```
S = Source node
D = Destination node
d = Distance from source to destination
N = Optimal division
B = Next node
Cᵢ = Set of candidate nodes i ← 1 ;
do
        if ( Neighbor of the S is located interval from $\frac{d}{N}(N-i) - \frac{d}{2N}$ to  $\frac{d}{N}(N-i) + \frac{d}{2N}$ )
            Cᵢ includes neighbor of the S ;
        Selects the B among the Cᵢ that minimizes the $p(S,D) = u(r) + u(s)$
        i ← i+1 ;
        S ← B ;
while ( i ≤ N )
```

```
S = Source node
D = Destination node
d = Distance from source to destination
N = Optimal division
B = Next node
C_i = Set of candidate nodes i ← 1 ;
do
```
if ( Neighbor of the $S$ is located interval from $\frac{d}{N}(N-i) - \frac{d}{2N}$ to $\frac{d}{N}(N-i) + \frac{d}{2N}$ and satisfies the equality $u(r) + u(d/N) \leq u(2d/N)$ $C_i$ include neighbor of the $S$ ;

if ($C_i$ != NULL)

Select the $B$ among the $C_i$ that minimizes the $p(S, D) = u(r) + u(s)$ else

Select $B$ near $d - \frac{i+1}{N} \times$ that minimizes $p(S, D) = u(r) + u(s)$ $i \leftarrow i+1$ ;

```
    i ← i+1 ;
    S ← B ;
while (i ≤ N)
```

```
S = Source node
D = Destination node
d = Distance from source to destination
N = Optimal division
B = Next node
C_i = Set of candidate nodes i ← 1 ;
do
        if ( Neighbor of the S is located interval from  d/N (N−i) − d/2N  to  d/N (N−i) + d/2N
            and satisfies the equality u(r) + u(d/N) ≤ u(2d/N)
                C_i include neighbor of the S ;
        if (C_i != NULL)
                Selects the B among the C_i that minimizes the p(S,D) = u(r) + v(s)
        else
                Selects B near d − (i+1)/N × that minimizes p(S,D) = u(r) + v(s)
                i ← i+1 ;
        i ← i+1 ;
        if (B = NULL)
                Selects the B among neighbor of S that minimizes p(S,D) = u(r) + v(s)
                Recalculate optimal N
                i ← 1 ;
        S ← B ;
while (i ≤ N)
```

METHOD FOR POWER SAVING ROUTING IN WIRELESS NETWORKS

CROSS-REFERENCE TO RELATED FOR APPLICATIONS

Pursuant to 35 U.S.C. 119(a) the present application derives priority from the following foreign filed patent application: Korean Patent Application No. 2003-29937; filed May 12, 2003.

BACKGROUND OF THE INVENTION

1. Field of the Invention

The present invention relates to a method for power saving routing in wireless networks. Specifically, the invention relates to a new routing method which makes up for the weak points in conventional low power consumption routing methods by implementing gradual accessibility to a routing destination node with an optimum number of nodes participating in routing.

2. Background of the Invention

Development of wireless telecommunications and hardware design techniques has created a new paradigm of "mobile computing" by which users can communicate with each other using their portable devices irrespective of their physical locations. This mobile computing using mobile terminals has many restrictions such as non-connectivity, low bands, variability of high bands, connection with heterogeneous networks, security, low power, small storage space, etc. To overcome the shortage of power supply, one of the restrictions, a power adaption routing method that controls transmission power according to a distance between two nodes is used.

Many studies have been carried out on a routing method for finding an appropriate path in wireless network environments. Most of conventional routing methods are designed to minimize the number of nodes passed when a path is selected or delayed. This shortest distance methods is not suitable for an environment requiring minimum energy consumption.

Accordingly, a technique for efficiently reducing power consumption in a wireless environment where power consumption of a terminal is determined by its battery occupies an important position. Recently, routing methods for decreasing power consumption have been proposed. These methods reduce transmission power to decrease the radius electric waves can reach. That is, conventional methods shorten a transmission distance by passing by intermediate nodes to save power consumption on the basis of the fact that power consumption according to transmission in a wireless environment is proportional to constant multiplication of a distance between two transmission/reception terminals.

However, these conventional routing methods are not based on the number of optimum nodes for reducing power consumption but rather they execute an algorithm until a destination node is found by way of intermediate nodes for minimizing expected power consumption. Accordingly, many nodes may participate in routing and desert from the shortest distance to the destination node, increasing power consumption.

A conventional power consumption model and routing method are explained in more detail.

A model for a distance between two nodes and power consumption in a wireless environment includes RM model and HCB model. A general model of power consumed between two nodes having the distance d between them can be represented by the following equation (1).

$$u(r) = ar^\alpha + c \quad (1)$$

where $\alpha$, a and c are constants for indicating power consumed for purposes other than transmission and reception and the properties of wireless environment.

The equation (1) is represented by the equation (2) in RM model.

$$u(d) = d^4 + 2*10^8 \quad (2)$$

According to Heizelman, Shandraksan and Balakrishnan, a terminal circuit consumes $E_{elec}=50$ nJ/bit in order to transmit/receive 1-bit radio data. When it is assumed that energy consumption according to energy transmission between two nodes having the distance d between them is proportional to a square of the distance d, a transmitting side consumes $E_{amp}*d^2$ ($E_{amp}=100$ pJ/bit/m$^2$). Accordingly, transmitting and receiving sides respectively consume $E^{elec}+E_{amp}*d^2$ and $E_{elec}$ in order to transmit 1-bit data between the two nodes having the distance d between them. Where the two power consumption are divided by $E_{amp}$ in order to normalize them, they can be represented by $T=E+d^2$ (transmitting side) and $P=E$ (receiving side). E is expressed as follows.

$$E = E_{elec}/E_{amp} = (50 \; nJ/bit)/(100 \; pJ/bit/m^2) = 500 \; m^2 \quad (3)$$

Accordingly, power required for overall transmission and reception is represented by the following equation (4), which is called HCB model.

$$u(d) = T + P = 2E + d^2 \quad (4)$$

In the meantime, according to Stojmenovic and Xu Lin, direct transmission is a technique requiring minimum quantity of power in the case where a distance d between a source node and a destination node is $d \leq (c/a(1-2^{1-\alpha}))^{1/\alpha}$. On the other hand, in other environments where the distance d between the source node and destination node, $d > (c/a(1-2^{1-\alpha}))^{1/\alpha}$, the method of dividing the distance between the two nodes by n (n is an integer close to $d(a(\alpha-1)/c)^{1/\alpha}$) and transmitting data through nodes placed at divided points minimizes power consumption. The quantity of power consumption obtained by this technique can be represented by the following equation (5).

$$v(d) = dc\left(a\frac{\alpha-1}{c}\right)^{\frac{1}{\alpha}} + da\left(a\frac{\alpha-1}{c}\right)^{\frac{1-\alpha}{\alpha}} \quad (5)$$

There was proposed a method for saving power consumption using the aforementioned equation as follows.

Figure 1:
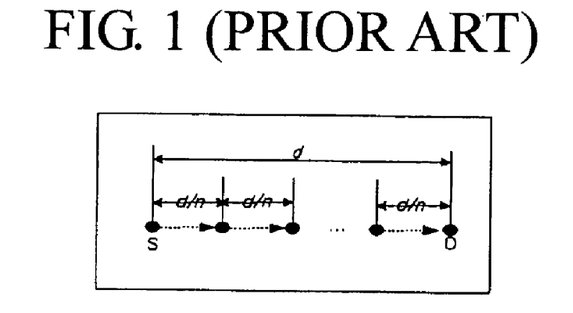
FIG. 1 illustrates equal division of a distance between a source node and a destination node.
Figure 2:
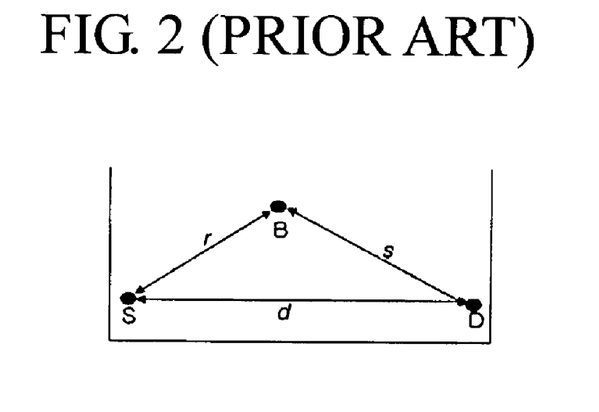
FIG. 2 illustrates a distance relation between nodes.

Referring to FIG. 2, to transmit data from a source node S to a destination node D via an intermediate node B, it is important to select the intermediate node B that minimizes expected power consumption. Here, r=|SB|, s=|BD| and d=|SD|.

Power Consumption needed for transmission between the node S and node B is $u(r)=ar^\alpha+c$. When it is assumed that there are intermediate nodes for minimizing power consumption between the node B and node D, expected minimum power consumption can be predicted as follows.

$$v(s) = sc\left(a\frac{\alpha-1}{c}\right)^{\frac{1}{\alpha}} + sa\left(a\frac{\alpha-1}{c}\right)^{\frac{1-\alpha}{\alpha}} \quad (6)$$

When α=2 in HCB model, the minimum power consumption is represented by the following equation (7).

$$v(s) = 2s(ac)^{\frac{1}{2}} \quad (7)$$

Accordingly, power consumption can be minimized by selecting the neighboring node B that minimizes the value of the equation (8).

$$p(S,D) = u(r) + v(s) \quad (8)$$

Furthermore, in the case where there is a neighboring destination node, data can be transmitted to the destination node immediately to prevent routing from forming a loop.

In the above-described conventional method, however, the intermediate node was selected on the assumption that the nodes are ideally distributed at desired middle points between the node to be participated in routing and the destination node to minimize power consumption. Accordingly, power consumption between the intermediate node and destination node was expected to be v(s) as represented by the following equation (9).

$$p(S, D) = u(r) + v(s) = 2E + r^2 + 2s(ac)^{\frac{1}{2}} \quad (9)$$

Figure 3:
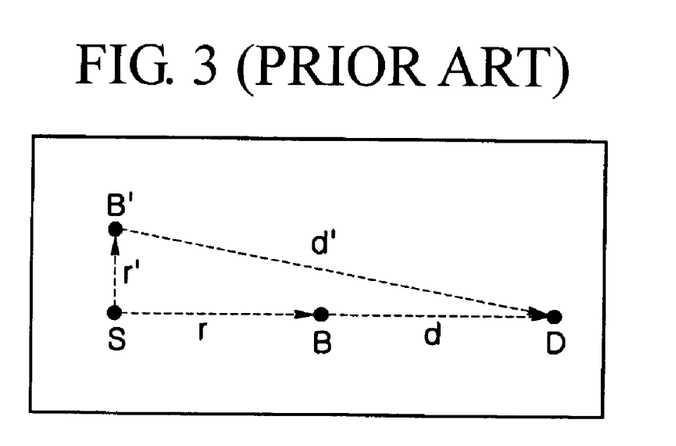
FIG. 3 illustrates selection of nodes.

That is, a factor that increases in proportion to a square of r and increases by a constant multiplication for d operates in FIG. 2. As shown in FIG. 3, accordingly, when value r' is smaller than value r, node B' is selected to become more distant from the destination node and gradual accessibility to the destination of routing may be lost.

Moreover, packets are continuously transmitted until the destination node is found. Accordingly, nodes more than the number of optimum nodes, which are participated in routing for saving power consumption, may participate in transmission. Furthermore, when the destination node exists at a neighboring node the packets are immediately sent to the destination node in order prevent formation of a loop, so that the optimum division value cannot be maintained. This may increase power consumption.

SUMMARY OF THE INVENTION

Accordingly, the present invention has been made in view of the above problems. An object of the present invention is to provide a new routing method which makes up for the weak points in the conventional low power consumption routing method to implement gradual accessibility to a routing destination node and the optimum number of nodes participating in routing.

To accomplish the object of the present invention, according to the present invention, there is provided a method for power saving routing between a source node and a destination node in wireless networks, comprising the following steps:

(1) a first step of setting an optimal integer value n for reducing power consumed between the source node and the destination node;

(2) a second step of setting n−1 concentric circles that have the destination node as their center and dividing a distance d between the source node and the destination node by n;

(3) a third step of setting a current execution node to the source node;

(4) a fourth step in which the current execution node selects nodes located within a predetermined distance from the circle that is closest to the current execution node in the direction of the destination node as candidate nodes, and selects a node for which power consumed between the node and the current execution node is minimum from the candidate nodes as an intermediate node; and, (5) a fifth step setting the current execution node as the selected intermediate node until routing between the source node and the destination node is finished and returning to the fourth step.

It is a further object of the invention that the fourth step may ignore the selected intermediate node when the selected intermediate node satisfies the condition, $$u(r) + u\left(\frac{d}{n}\right) > u\left(\frac{2d}{n}\right)$$

(r is a distance between the current execution node and the selected intermediate node, u(x) is power consumption between two nodes having a distance x between them), and select the intermediate node again for the second closest circle in the direction of the destination node.

It is a further object of the invention that when there is not candidate node between the source node and the destination node, the fourth step finds a neighboring node for which u(r)+v(s) (r is a distance between the current execution node and an arbitrary neighboring node, s is a distance between the current execution node and the destination node, and v(x) is minimum power consumption expected between two nodes having a distance x between them) has a minimum value, and then repeatedly performs the first to fifth steps, having the neighboring node as the source node.

In the meantime, according to Stojmenovic and Xu Lin, direct transmission is a technique requiring minimum quantity of power in the case where a distance d between a source node and a destination node is $d \leq (c/a(1-2^{1-\alpha}))^{1/\alpha}$. On the other hand, in other environments where the distance d between the source node and destination node, $d > (c/a(1-2^{1-\alpha}))^{1/\alpha}$, the method of dividing the distance between the two nodes by n (n is generally known to denote the optimum number of a routing hop, e.g., the number of nodes in the midst of routing, for minimizing the power consumption if a distance between a source node and a destination node and a transmission distance with the maximum power output are determined, where n is an integer close to $d(a(\alpha-1)/c)^{1/\alpha}$) and transmitting data through nodes placed at divided points minimizes power consumption. The quantity of power consumption obtained by this technique can be represented by the following equation (5).

$$v(d) = dc\left(a\frac{a-1}{c}\right)^{\frac{1}{a}} + da\left(a\frac{a-1}{c}\right)^{\frac{1-a}{a}} \quad (5)$$

BRIEF DESCRIPTION OF THE DRAWINGS

The above and other objects, features and advantages of the present invention will more apparent from the following detailed description of the preferred embodiments of the invention in conjunction with the accompanying drawings, in which.

DETAILED DESCRIPTION OF THE INVENTION

Reference will now be made in detail to the preferred embodiments of the present invention, examples of which are illustrated in the accompanying drawings.

Figure 4:
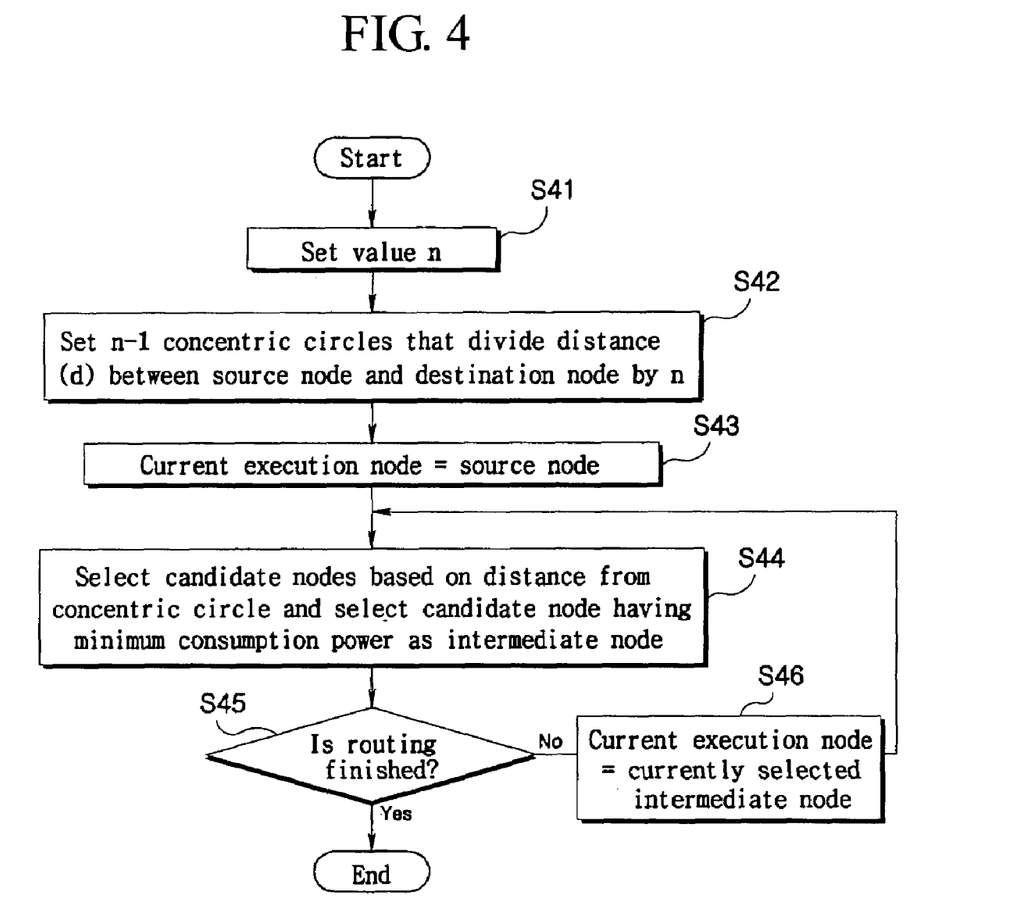
FIG. 4 is a flow chart showing an embodiment of a routing method according to the present invention.

A method for power saving routing in wireless networks according to the present invention will be explained with reference to FIG. 4. An optimal integer value n for reducing power consumed between a source node and a destination node is set at the first step S41. The distance from the source node to the destination node is divided by n.

Figure 5:
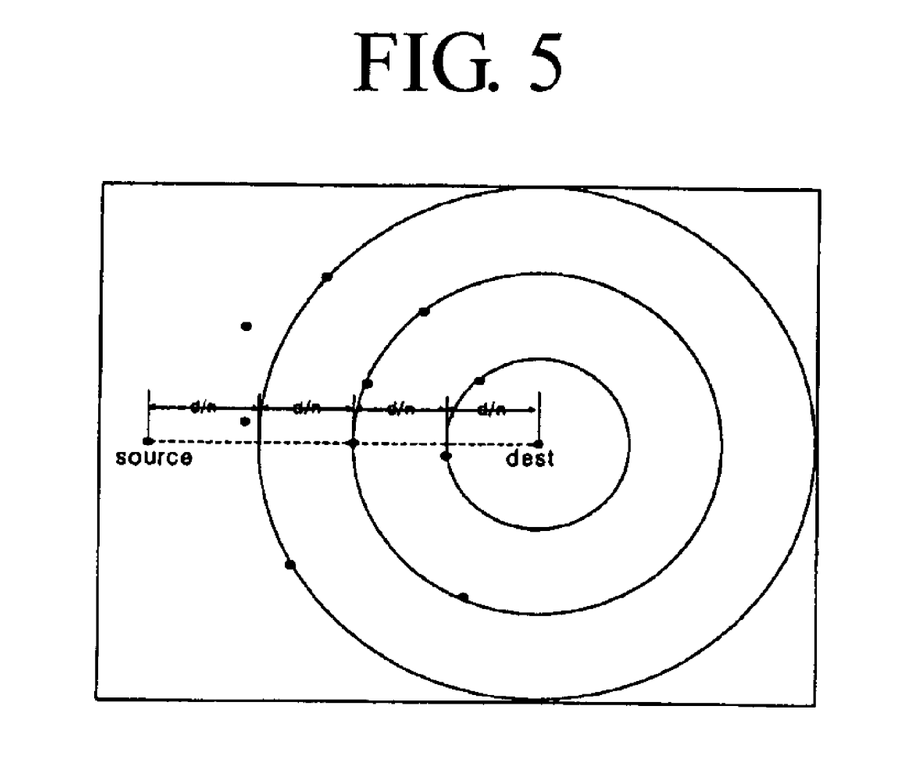
FIG. 5 illustrates node arrangement and setting of concentric circles for explaining the present invention.

As shown in FIG. 5, the second step S42 sets n−1 concentric circles that have the destination node as their center and divide the distance d between the source node and destination node by n. When the lineal distance between the source node and destination node is d, each distance divided by the concentric circles on the lineal distance becomes d/n.

Now, transmission is carried out from the source node to the destination node. First, the third step S43 sets the current execution node to the source node. The current execution node means a node currently executing transmission, and the source node from which transmission starts becomes the initial current execution node.

Figure 6:
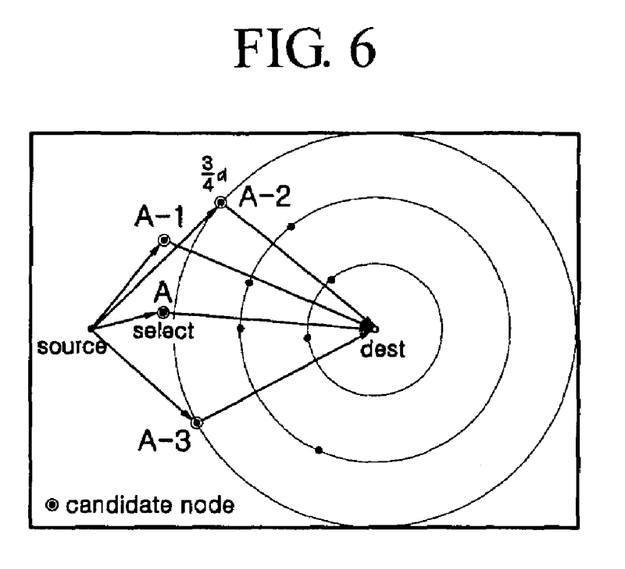
FIG. 6 illustrates a first embodiment of selecting an intermediate node.

The current execution node selects nodes, which are located within a predetermined distance from the concentric circle closest to the current execution node in the direction of the destination node, as candidate nodes, and selects a node having minimum power consumed between that node and the current execution node from the candidate nodes as an intermediate node at the fourth step S44. Referring to FIG. 6, the source node that is the current execution node selects nodes A, A-1, A-2 and A-3 located within a predetermined distance from the first concentric circle as candidate nodes, and selects the candidate node (for example, node A) having minimum power consumed between itself and each candidate node as the intermediate node.

The fourth step is repeated until transmission to the destination node that is the final destination is accomplished. That is, the intermediate node selected at the fourth step is set as the current execution node and the fourth step is repeated until routing between the source node and destination node is finished at the fifth step S45 and S46.

Figure 7:
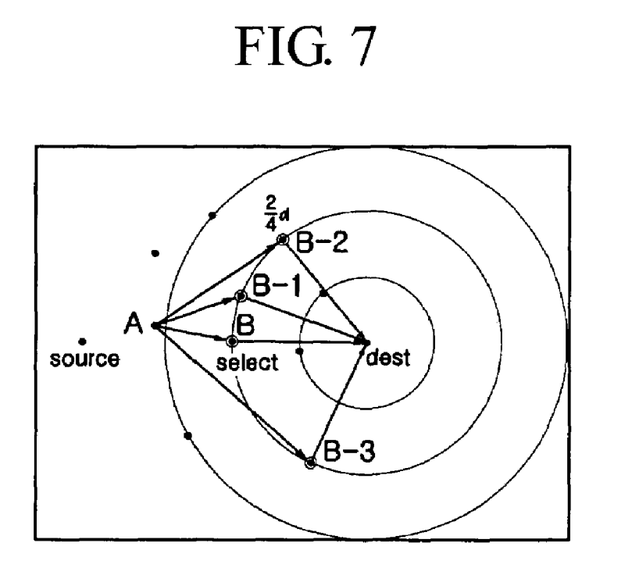
FIG. 7 illustrates a second embodiment of selecting an intermediate node.

Referring to FIG. 7, because the node A was selected as the intermediate node in FIG. 6 and this node A was set as the current execution node through the step S46, the fourth step S44 is carried out for the node A. That is, the node A that is the current execution node selects nodes B, B-1, B-2 and B-3 located within a predetermined distance from the second concentric circle as candidate nodes, and selects the candidate node (for example, node B) having the minimum power consumed between itself and each candidate node as the intermediate node.

Since routing is not finished yet, it is continued.

Figure 8:
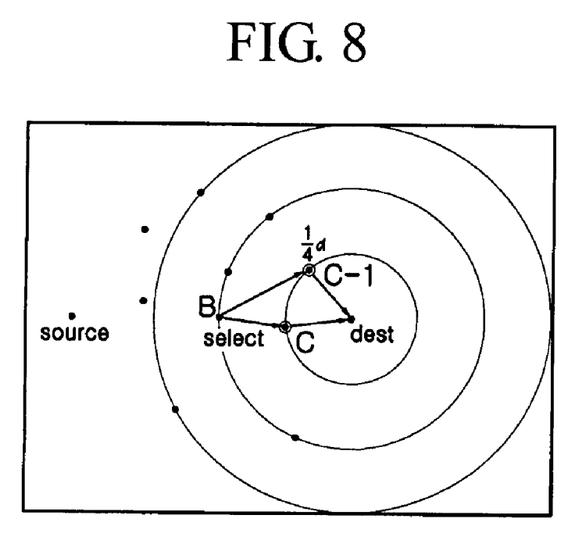
FIG. 8 illustrates a third embodiment of selecting an intermediate node.

Referring to FIG. 8, because the node B was selected as the intermediate node in FIG. 7 and this node B was set as the current execution node through the step S46, the fourth step S44 is carried out for the node B. That is, the node B that is the current execution node selects nodes C and C-1 located within a predetermined distance from the third concentric circle as candidate nodes, and selects the candidate node (for example, node C) having the minimum power consumed between itself and each candidate node as the intermediate node.

Figure 9:
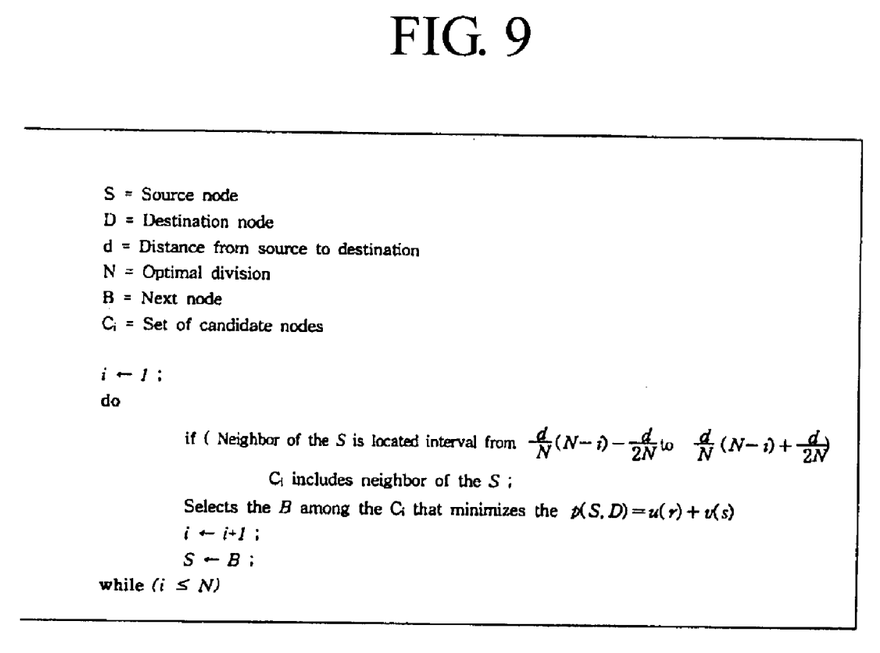
FIG. 9 illustrates an embodiment of a method for performing the fourth step of the present invention.

The aforementioned procedure is repeated until transmission to the destination node is accomplished. The distance to the destination node is reduced by average d/n whenever one intermediate node is selected. Thus, it is possible to arrive at the destination node by repeating the procedure n times. That is, the distance to the destination node can be gradually reduced while routing is carried out so that accessibility can be improved and the number of nodes participating in routing can be optimally controlled. FIG. 9 illustrates an algorithm for executing the fourth and fifth steps.

Figure 10:
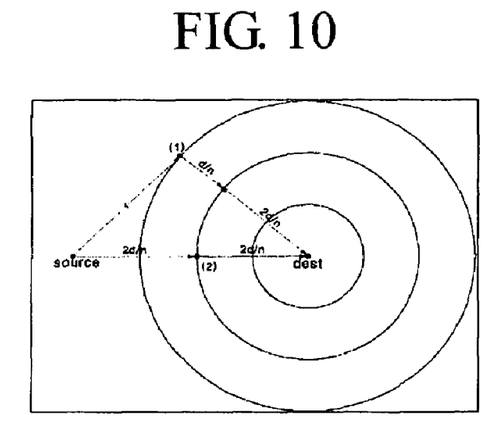
FIG. 10 illustrates the case where a candidate node is distant from a source node.

In the meantime, when a node (1) selected as the intermediate node is at a great distance from the source node, as shown in FIG. 10, it may be more appropriate to select a node (2). Accordingly, when the selected intermediate node satisfies a specific condition, it is preferable to select the node (2).

Figure 11:
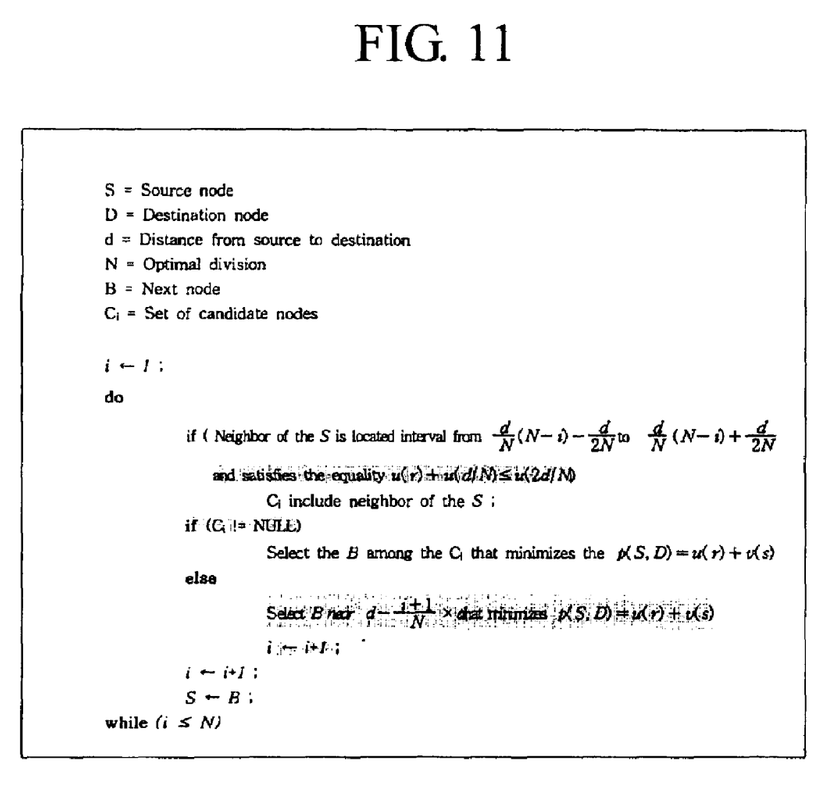
FIG. 11 illustrates an embodiment in the case where the candidate node is distant from the source node.

Specifically, when the selected intermediate node satisfies the condition, $$u(r) + u\left(\frac{d}{n}\right) > u\left(\frac{2d}{n}\right),$$

the fourth step can ignore the selected intermediate node and select the n n intermediate node again for the second closest to the destination node. Here, r denotes a distance between the current execution node and the selected intermediate node, and u(x) means power consumption between two nodes having a distance x between them. FIG. 11 shows an algorithm for executing the fourth and fifth steps in this case.

Figure 12:
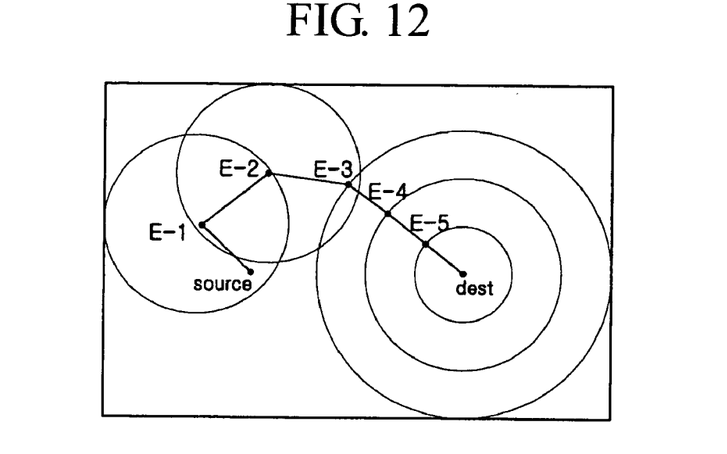
FIG. 12 illustrates the case where there is no candidate node.

Furthermore, in the case where there is no candidate node selected between the source node and destination node, as shown in FIG. 12, it is preferable that a neighboring node for which p(S,D)=u(r)+v(s) has a minimum value is found and then the present invention is applied to this neighboring node.

Figure 13:
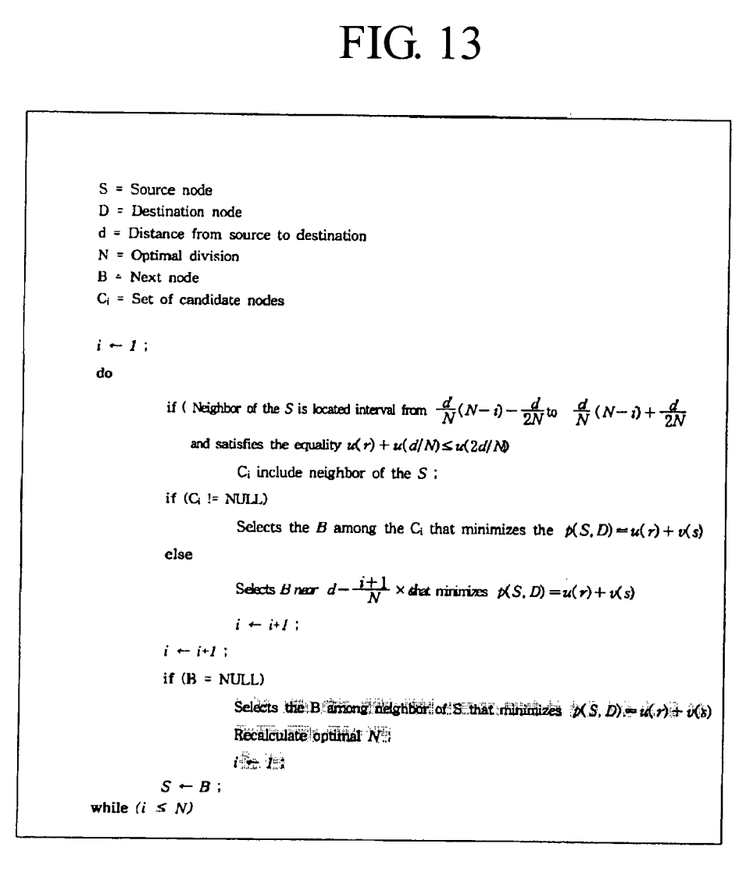
FIG. 13 illustrates an embodiment in the case where there is no candidate node.

Referring to FIG. 12, the source node selects the neighboring node E-2 that satisfies the condition when it cannot find any candidate node. When the source node can find a candidate node even for the node E-2, it selects the neighboring node E-3 that satisfies the condition. A candidate node can be found for the node E-3 so that the steps S41 to S46 are applied to the node E-3 to perform routing to the destination node. In this embodiment, routing from the source node to the destination node is sequentially carried out from the source node, node E-1, node E-2, node E-3, node E-4, node E-5 to the destination node. FIG. 13 shows an algorithm to which the present invention is applied in this case.

According to the present invention, a distance to a destination is calculated to select and estimate candidate nodes so as to reduce the amount of calculations in the event of routing. Furthermore, although the algorithm is repeatedly performed until the next node becomes the destination node in the conventional method, the present invention repeatedly performs the algorithm by the optimal value n so that accessibility to the destination node can be obtained. This enables more efficient routing.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

We claim:

1. A method for power saving routing between a source node and a destination node in wireless networks, comprising:
   (a) a first step of setting an optimal integer value n for reducing power consumed between the source node and the destination node;
   (b) a second step of setting n−1 concentric circles that have the destination node as their center and dividing a distance d between the source node and the destination node by n;
   (c) a third step of setting a current execution node to the source node;
   (d) a fourth step wherein said current execution node selects nodes located within a predetermined distance from the circle that is closest to the current execution node in the direction of the destination node as candidate nodes, and selects a node for which power consumed between the node and the current execution node is minimum from the candidate nodes as an intermediate node; and
   (e) a fifth step of setting the current execution node as the selected intermediate node until routing between the source node and the destination node is finished and returning to the fourth step.

2. The method as claimed in claim 1, wherein the predetermined distance is:

$$\frac{d}{n} - \frac{d}{2n} \text{ to } \frac{d}{n} + \frac{d}{2n}.$$

3. The method as claimed in claim 1, wherein the fourth step ignores the selected intermediate node when the selected intermediate node satisfies the condition, $$u(r) + u\left(\frac{d}{n}\right) > u\left(\frac{2d}{n}\right)$$

(r is a distance between the current execution node and the selected intermediate node, u(x) is power consumption between two nodes having a distance x between them), and selects the intermediate node again for the second closest circle in the direction of the destination node.

4. The method as claimed in claim 2, wherein the fourth step ignores the selected intermediate node when the selected intermediate node satisfies the condition, $$u(r) + u\left(\frac{d}{n}\right) > u\left(\frac{2d}{n}\right)$$

(r is a distance between the current execution node and the selected intermediate node, u(x) is power consumption between two nodes having a distance x between them), and selects the intermediate node again for the second closest circle in the direction of the destination node.

5. The method as claimed in claim 1, wherein the fourth step finds a neighboring node for which u(r)+v(s) (r is a distance between the current execution node and an arbitrary neighboring node, s is a distance between the current execution node and the destination node, and v(x) is minimum power consumption expected between two nodes having a distance x between them) has a minimum value, and then repeatedly performs the first to fifth steps, having the neighboring node as the source node, when there is no candidate node.

6. The method as claimed in claim 2, wherein the fourth step finds a neighboring node for which u(r)+v(s) (r is a distance between the current execution node and an arbitrary neighboring node, s is a distance between the current execution node and the destination node, and v(x) is minimum power consumption expected between two nodes having a distance x between them) has a minimum value, and then repeatedly performs the first to fifth steps, having the neighboring node as the source node, when there is no candidate node.

* * * * *